United States Patent [19]
Tersch et al.

[11] 3,731,591
[45] May 8, 1973

[54] GEAR SHAVING MACHINE

[75] Inventors: Richard W. Tersch, Grosse Pointe Woods; Arthur B. Bassoff, Oak Park, both of Mich.

[73] Assignee: Lear Siegler, Inc., Santa Monica, Calif.

[22] Filed: Nov. 29, 1971

[21] Appl. No.: 202,886

[52] U.S. Cl. ............................... 90/1.6, 90/6, 90/7, 90/10, 90/43
[51] Int. Cl. ............................. B23f 9/04, B23f 5/12
[58] Field of Search ......................... 90/1.4, 1.6, 10, 90/8, 43, 6, 7

[56] References Cited

UNITED STATES PATENTS

| | | | |
|---|---|---|---|
| 1,587,815 | 6/1926 | Boas | 90/43 X |
| 2,035,434 | 3/1936 | Loewus | 90/1.4 X |
| 2,125,873 | 8/1938 | Aeberli | 90/7 |

*Primary Examiner*—Francis S. Husar
*Attorney*—Donald P. Bush

[57] ABSTRACT

A machine for shaving the teeth of a relatively large gear and simultaneously imparting a longitudinally crowned formation thereto, comprising a tiltable guide member, a cutter head slide movable along the tiltable guide member, and cam means interconnecting the cutter head slide and a stationary frame portion to control tilting of the guide member in accordance with movement of the cutter head slide therealong.

10 Claims, 1 Drawing Figure

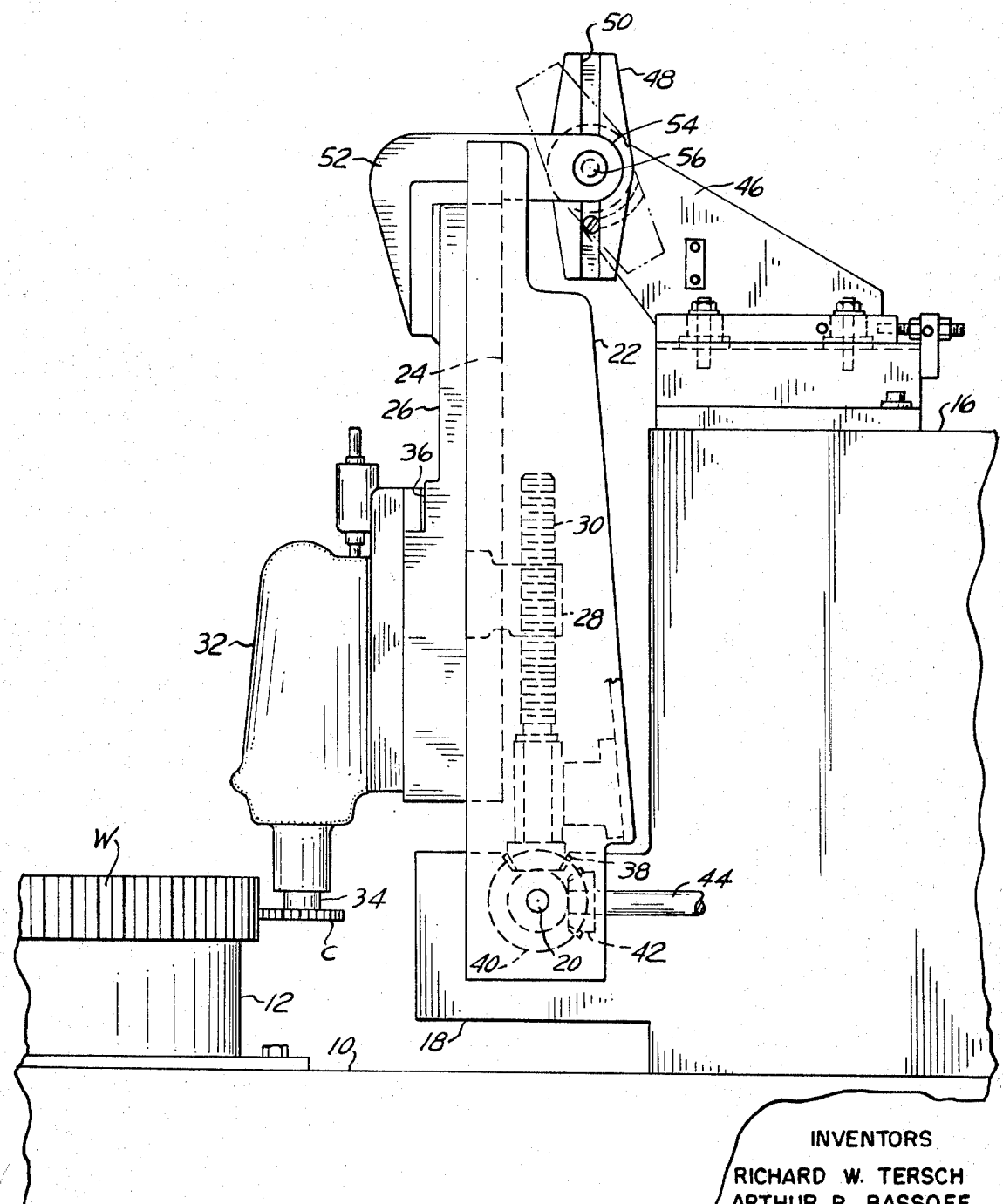

GEAR SHAVING MACHINE

BRIEF DESCRIPTION OF THE INVENTION

The present machine is intended for use in shaving very large gears and for this purpose is provided with a work support having a vertical axis and including means for effecting positive rotation of the work support. At one side of the work support there is provided a vertical column which is spaced substantially laterally of a work gear carried by the work support and extends to a point substantially above the plane of the work gear.

The guide member is mounted for tilting movement about a horizontal pivot axis which extends perpendicularly to the axis of the work support. The guide member is provided with rectilinear ways carrying a cutter heat slide. The cutter head is mounted on the cutter head slide in position to carry a cutter in mesh with the work gear and is angularly adjustable to provide a predetermined crossed axes relationship between the work gear and cutter.

At the upper end of the cutter head slide and at the upper end of the column there is provided cam means effective to rock the guide member about its pivot mounting in accordance with movement of the cutter head slide therealong.

The cutter support structure including the column, the guide member, and the cutter head slide, constitute an assembly which is movable on the machine frame radially of the work support to accomplish a depth feeding movement.

BRIEF DESCRIPTION OF THE DRAWING

The FIGURE is a fragmentary elevational view showing the essential components of the gear shaving machine.

DETAILED DESCRIPTION

Referring now to the drawing, the machine comprises a frame including a base 10 carrying a work support 12 on which a work gear W is mounted for rotation with its axis extending vertically. Suitable means (not shown) which may be in the form of a driving worm and a worm gear, are provided for effecting rotation of the work gear W.

Mounted on the base 10 is tool support structure indicated generally at 14 and comprising a column 16 spaced substantially laterally from the work support 12 and provided with depth feed mechanism which may take the form of a feed nut and screw (not shown) adapted to move the tool support structure horizontally toward and away from the work support 12 to accomplish depth feed.

The column 16 includes a pivot mount extension 18 extending toward the work support and providing means 20 for supporting a guide member 22 for rocking movement about the axis of the pivot means 20. The guide member 22 is provided with vertically extending rectilinear ways indicated at 24. Mounted in the ways 24 for movement therealong is a cutter head slide 26 having a nut 28 fixedly connected thereto and engaging a traverse screw 30 carried by the guide member 22 and extending parallel to the ways 24.

The cutter head slide 26 carries a cutter head 32 having a rotary cutter support 34 adapted to support a cutter C in mesh with the work gear W. Arcuate ways diagrammatically indicated at 36 are provided intermediate the cutter head slide 26 and the cutter head 32 and provide for angular adjustment of the cutter head about an axis passing horizontally through the midplane of the cutter and radially of the work gear W. This adjustment is for the purpose of meshing the cutter and work gear at limited crossed axes, as is familiar in crossed axes gear shaving.

Means are provided for effecting rotation of the traverse screw 30 while permitting rocking movement or inclination of the guide member 22 about the axis of pivot support 20. This means comprises a bevel gear 38 fixed to the lower end of the traverse screw 30 and in mesh with a bevel gear 40 whose axis is coincident with the axis of the pivot support 20. Bevel gear 40 is in turn driven by a bevel gear 42 fixed to an input shaft 44. Accordingly, rotation of the shaft 44 is effective to rotate the traverse screw 30 while permitting inclination or rocking movement of the guide member 22.

In order to provide for tilting of the cutter C in accordance with its traverse in order to produce a crowned formation on the teeth of the work gear W, a bracket 46 is fixed to the upper end of the column 16 and carries an angularly adjustable cam 48 having a longitudinally extending cam slot 50. Fixed to the upper end of the cutter head slide 26 is a bracket 52 having an arm 54 which extends through a slot provided at the upper end of the guide member 22 and carries a follower pin 56 which is received in the slot 50.

With the above described arrangement, rotation of the shaft 44 will effect vertical movement of the cutter head slide sufficient to cause the cutter C to traverse the work gear W from side to side so that the shaving action of the cutter teeth is extended from end to end of the gear teeth. It will be appreciated that while the cutter is shown for convenience with its axis vertical, in practice it will be inclined at a small angle, less than 30°, from the vertical so that the familiar crossed axes gear shaving operation takes place.

As the cutter slide 26 moves vertically in the ways 24 provided in the tiltable guide member 22, the cam follower 56 will cause rocking movement of the guide member 22 which of course will result in a related rocking movement of the cutter head.

The action is quite different from a conventional crowning operation in which the cutter is normally operated in fixed position and a work table is reciprocated along stationary ways while the crowning table is rocked relative to the work table in accordance with traverse of the work table.

In the present case the axis about which the guide member 22 rocks remains fixed in space but the cutter has a motion which is made up of its traverse movement parallel to the ways 24 and a tilting movement resulting from tilting of these ways as the cam mechanism causes the guide member 22 to rock about the axis of pivot means 20. Thus, it will be seen that in the present case the rectilinear ways which provide for relative traverse between the gear and cutter are themselves rocked or tilted in accordance with relative traverse.

What we claim as our invention is:

1. A gear crowning machine for very large gears comprising a frame, a rotary work support on said frame, means for driving the work support in rotation, tool support structure movable on said frame toward and away from said work support, a pivot mounting on said support structure having its axis perpendicular to and spaced a substantial distance from said work support and located substantially in the middle plane of a work gear on said work support, a guide member pivoted to said pivot mounting and having rectilinear ways extending generally parallel to the axis of said work support, an elongated cutter head slide movable along said ways, a cutter head mounted on said slide for angular adjustment thereof about an axis extending substantially radially from the axis of said work support, a rotary cutter support on said cutter head for mounting a gear-like cutter in mesh at crossed axes with a work gear on said work support, traverse mechanism between said guide member and said cutter head slide effective to move said cutter head slide along the ways of said guide member, and adjustable cam means having a part fixed to said frame and a part fixed to said cutter head slide, said cam means being effective to rock said guide member about the axis of said pivot mounting as said cutter head slide is traversed along the ways of said guide member.

2. A machine as defined in claim 1 in which said work support has its axis vertical, said tool support structure comprising a column spaced laterally from and extending substantially above said work support, the parts of said cam being located at the top of said column and at the upper end of said cutter head slide.

3. A machine as defined in claim 2 in which said cam part carried at the upper end of said column comprises an adjustable slotted member, and the cam part carried at the upper end of said cutter head slide comprises a follower movable in the slot of said slotted member.

4. A machine as defined in claim 3, said slotted member being adjustable into a position in which the slot therein extends vertically so that crowning action may be rendered inoperative.

5. A machine as defined in claim 1 in which said traverse mechanism comprises a feed screw and nut device and transmission gearing including a gear coaxial with said pivot mounting.

6. A machine as defined in claim 5 in which said traverse mechanism comprises a rotatable feed screw shaft extending parallel to the ways in said guide member, a bevel gear fixed to said shaft, and in which the gear coaxial with the pivot mounting is a second bevel gear in mesh with the bevel gear fixed to said shaft.

7. A gear crowning machine comprising a frame, a rotary work support on said frame, cutter support structure movable on said frame toward and away from said work support, a pivot mounting on said cutter support structure having its axis perpendicular to and spaced a substantial distance laterally from the axis of said rotary work support and located approximately in the mid-plane of a work gear on said work support, and elongated guide member pivoted at one end to said pivot mounting and having rectilinear guide ways thereon extending generally parallel to the axis of the work support, a cutter slide mounted for movement along said ways, a rotary cutter support on said cutter slide, means for driving said work support in rotation, means for traversing said cutter slide along said ways, and cam means connecting said cutter slide and said cutter support structure to rock said guide member about the axis of said pivot mounting in accordance with traverse of said cutter slide along the ways of said guide member.

8. A machine as defined in claim 7 in which said work support has its axis of rotation vertical, and in which said guide member is pivoted at its lower end to said pivot mounting and extends upwardly therefrom and its guide ways are vertical when said guide member is in mid-position.

9. The method of crown shaving a wide gear with a substantially narrower gear-like shaving cutter which comprises rotating the cutter in tight mesh at crossed axes with the gear, relatively reciprocating the cutter and gear in opposite directions generally parallel to the axis of the gear from a midposition in which the common normal to the axes of the gear and cutter lies substantially midway between the sides of both the gear and cutter, to limiting positions at which the cutter engages end portions of the gear teeth, and return, and superimposing upon such relative reciprocation and in timed relation thereto a first additional movement equivalent to a depth feed resulting from bodily movement of the cutter radially inwardly of the gear during the phase of relative movement in which contact between the teeth of the gear and cutter is shifting from the central portions of the gear teeth toward either ends thereof, and vice-versa, and a second additional movement in timed relation to such relative reciprocation equivalent to a tilting of the cutter about an axis which is perpendicular to the axis of the gear and is spaced laterally from the side of the cutter remote from the gear.

10. The method as defined in claim 9 in which the direction of relative tilting is such that the edge of the cutter remote from the gear moves further from the mid-plane of the gear than does the edge of the cutter adjacent the gear.

* * * * *